United States Patent
Doyle et al.

(10) Patent No.: US 10,593,632 B2
(45) Date of Patent: Mar. 17, 2020

(54) SECURITY ARRANGEMENT FOR INTEGRATED CIRCUITS USING ARRAYS OF CAPACITIVE ELEMENTS

(71) Applicant: International Business Machines Corporation, Armonk, NY (US)

(72) Inventors: Matthew S. Doyle, Chatfield, MN (US); Jeffrey N. Judd, Oronoco, MN (US); Scott D. Strand, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 15/452,325

(22) Filed: Mar. 7, 2017

(65) Prior Publication Data
US 2018/0261559 A1   Sep. 13, 2018

(51) Int. Cl.
*H04L 9/00* (2006.01)
*H01L 23/00* (2006.01)
*H01L 23/528* (2006.01)
*H01L 23/522* (2006.01)
*G06F 21/85* (2013.01)
*G06F 21/55* (2013.01)

(52) U.S. Cl.
CPC .......... *H01L 23/576* (2013.01); *G06F 21/554* (2013.01); *G06F 21/85* (2013.01); *H01L 23/528* (2013.01); *H01L 23/5222* (2013.01)

(58) Field of Classification Search
CPC . H01L 23/576; H01L 23/528; H01L 23/5222; G06F 21/554; G06F 21/85

USPC ......................................................... 726/23
See application file for complete search history.

(56) References Cited

U.S. PATENT DOCUMENTS

| | | | |
|---|---|---|---|
| 5,691,697 A * | 11/1997 | Carvalho | G08B 13/20 340/426.24 |
| 7,015,823 B1 | 3/2006 | Gillen et al. | |
| 7,170,409 B2 | 1/2007 | Ehrensvard et al. | |
| 7,843,339 B2 | 11/2010 | Kirmayer | |
| 7,884,625 B2 | 2/2011 | Bartley et al. | |
| 7,989,918 B2 | 8/2011 | Bartley et al. | |
| 8,122,798 B1 * | 2/2012 | Shafer | B23D 59/001 324/676 |
| 8,576,536 B2 | 11/2013 | Rossi et al. | |
| 8,659,908 B2 | 2/2014 | Adams et al. | |
| 2002/0199111 A1 | 12/2002 | Clark et al. | |

(Continued)

*Primary Examiner* — Abu S Sholeman
(74) *Attorney, Agent, or Firm* — Patterson + Sheridan, LLP

(57) ABSTRACT

An apparatus is disclosed that comprises a first security arrangement that overlaps a plurality of electronic components arranged within one or more layers. The first security arrangement comprises a first conductive layer patterned as a first array of a plurality of first conductive elements, and a second conductive layer separated from the first conductive layer by a dielectric layer. The second conductive layer patterned as a second array of a plurality of second conductive elements, and the first array and the second array collectively form a plurality of capacitive elements. The apparatus further comprises monitoring circuitry coupled with the first security arrangement and configured to detect a change in a capacitance of a first capacitive element of the plurality of capacitive elements, and determine, based on a location of the first capacitive element within the first array, whether to perform a predefined security action.

19 Claims, 5 Drawing Sheets

(56) References Cited

U.S. PATENT DOCUMENTS

| | | | |
|---|---|---|---|
| 2003/0149914 A1* | 8/2003 | Kim | G06F 21/87 |
| | | | 714/30 |
| 2010/0026313 A1* | 2/2010 | Bartley | H01L 23/576 |
| | | | 324/548 |
| 2011/0001549 A1* | 1/2011 | Van Gastel | H03K 17/955 |
| | | | 327/517 |
| 2012/0063046 A1* | 3/2012 | Rossi | G06F 21/86 |
| | | | 361/78 |
| 2012/0180140 A1* | 7/2012 | Barrowman | G08B 21/18 |
| | | | 726/34 |
| 2012/0185636 A1 | 7/2012 | Leon et al. | |
| 2014/0320151 A1* | 10/2014 | Filippi | G06F 21/87 |
| | | | 324/679 |

* cited by examiner

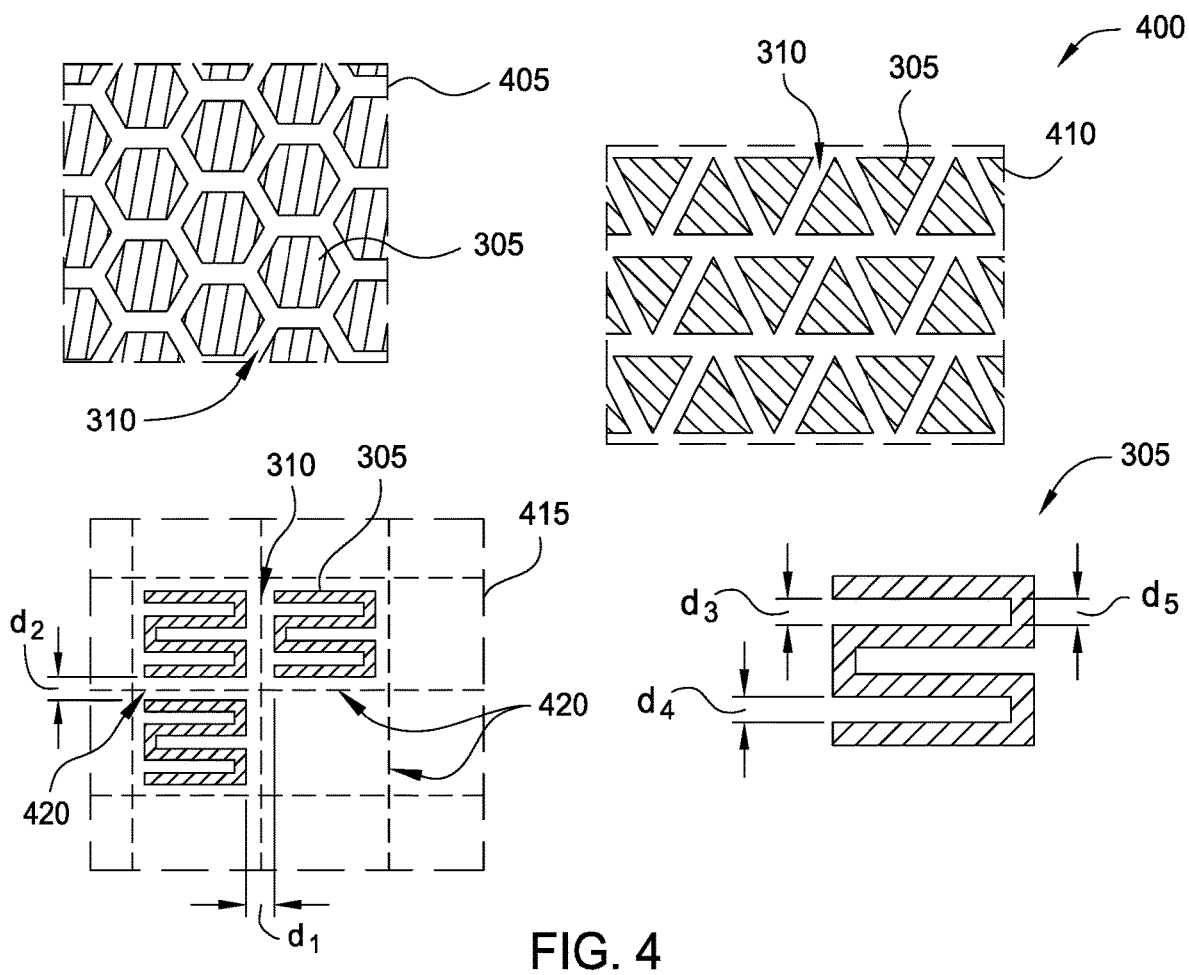
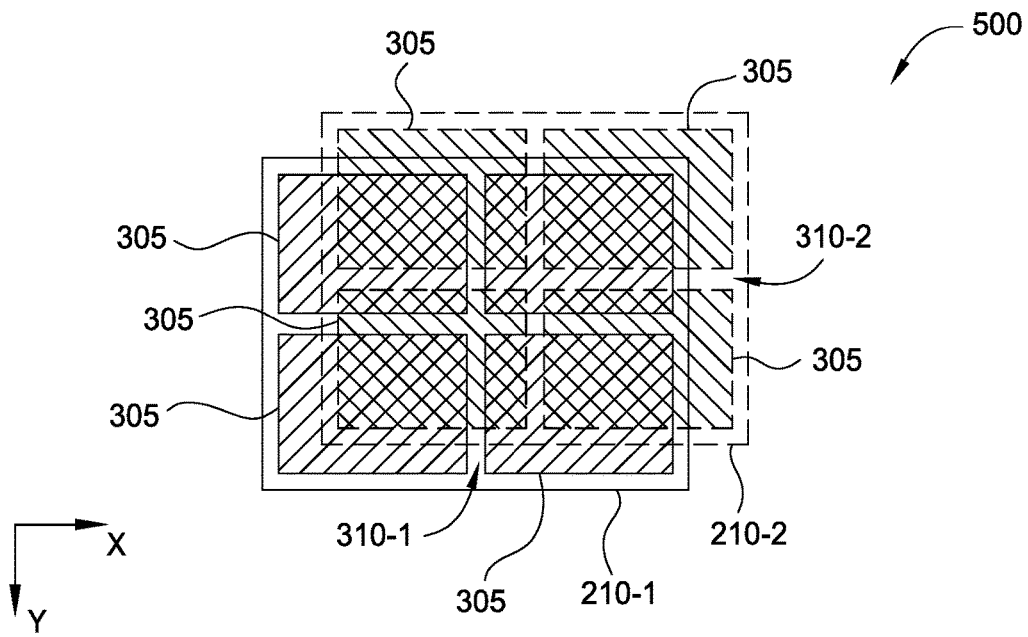
FIG. 4
FIG. 5

SECURITY ARRANGEMENT FOR INTEGRATED CIRCUITS USING ARRAYS OF CAPACITIVE ELEMENTS

BACKGROUND

The present disclosure relates generally to integrated circuits, and more specifically, to protecting electronic components and data stored in integrated circuits.

Protecting integrated circuit technology and data is a substantial concern in the commercial and industrial sectors. Integrated circuits and related devices are routinely acquired by motivated commercial and/or governmental competitors that seek to reverse engineer or to otherwise learn the functionality of the technology. The acquired information can be used by the competitors to provide a technological leap in their own devices, and/or to exploit a perceived weakness in the examined equipment. Thus, sophisticated governmental and commercial entities possess ample strategic and/or economic motivations to reverse engineer integrated circuit components.

Reverse engineering of an integrated circuit may be performed while the integrated circuit is in a powered-on state in order to observe its functionality. Designers of the integrated circuit may thus implement safeguard measures within the integrated circuit to take advantage of the powered-on state, such as a self-destruct or obstructing mechanism that is triggered by the detection of tampering. However, such safeguard measures may not distinguish between sensitive components and non-sensitive components of the integrated circuit, such that a detected tampering event may disable or otherwise affect operation of the non-sensitive components.

SUMMARY

According to one embodiment, an apparatus is disclosed that comprises a first security arrangement that overlaps a plurality of electronic components arranged within one or more layers. The first security arrangement comprises a first conductive layer patterned as a first array of a plurality of first conductive elements, and a second conductive layer separated from the first conductive layer by a dielectric layer, the second conductive layer patterned as a second array of a plurality of second conductive elements, wherein the first array and the second array collectively form a plurality of capacitive elements. The apparatus further comprises monitoring circuitry coupled with the first security arrangement and configured to detect a change in a capacitance of a first capacitive element of the plurality of capacitive elements, and determine, based on a location of the first capacitive element within the first array, whether to perform a predefined security action.

According to another embodiment, an integrated circuit is disclosed that defines one or more exterior surfaces. The integrated circuit comprises one or more layers having a plurality of electronic components defined therein, and a first security arrangement disposed between the one or more layers and a first exterior surface of the integrated circuit. The first security arrangement comprises a plurality of capacitive elements that spatially overlap the plurality of electronic components. The integrated circuit further comprises monitoring circuitry configured to detect, responsive to a physical intrusion of the first security arrangement, a change in a capacitance of a first capacitive element of the plurality of capacitive elements, and determine, based on which of the plurality of electronic components are overlapped by the first capacitive element, whether to perform a predefined security action.

According to another embodiment, a method is disclosed for use with a security arrangement that overlaps a plurality of electronic components. The plurality of electronic components are arranged within one or more layers of an integrated circuit. The security arrangement comprises a first conductive layer electrically insulated from a second conductive layer. The method comprises detecting a change in a capacitance of a first capacitive element of a plurality of capacitive elements, wherein the plurality of capacitive elements are formed of a plurality of first conductive elements of the first conductive layer and a plurality of second conductive elements of the second conductive layer. The method further comprises determining, based on which of the plurality of electronic components are overlapped by the first capacitive element, whether to perform a predefined security action.

BRIEF DESCRIPTION OF THE SEVERAL VIEWS OF THE DRAWINGS

FIG. 4 is a schematic diagram of alternative patterns for a plurality of conductive elements, according to embodiments described herein.

FIG. 5 is a schematic diagram illustrating staggered arrays of conductive elements, according to embodiments described herein.

DETAILED DESCRIPTION

The descriptions of the various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Various embodiments disclosed herein describe security arrangements for integrated circuits that are capable of providing localized detection and/or response to detected tampering events. For example, different security actions (or no security action) may be performed based on whether the tampering event occurs in the proximity of sensitive circuitry or not. The security arrangement generally comprises multiple conductive layers that each define an array of conductive elements, where combinations of overlapping conductive elements form a plurality of capacitive elements.

Figure 1:
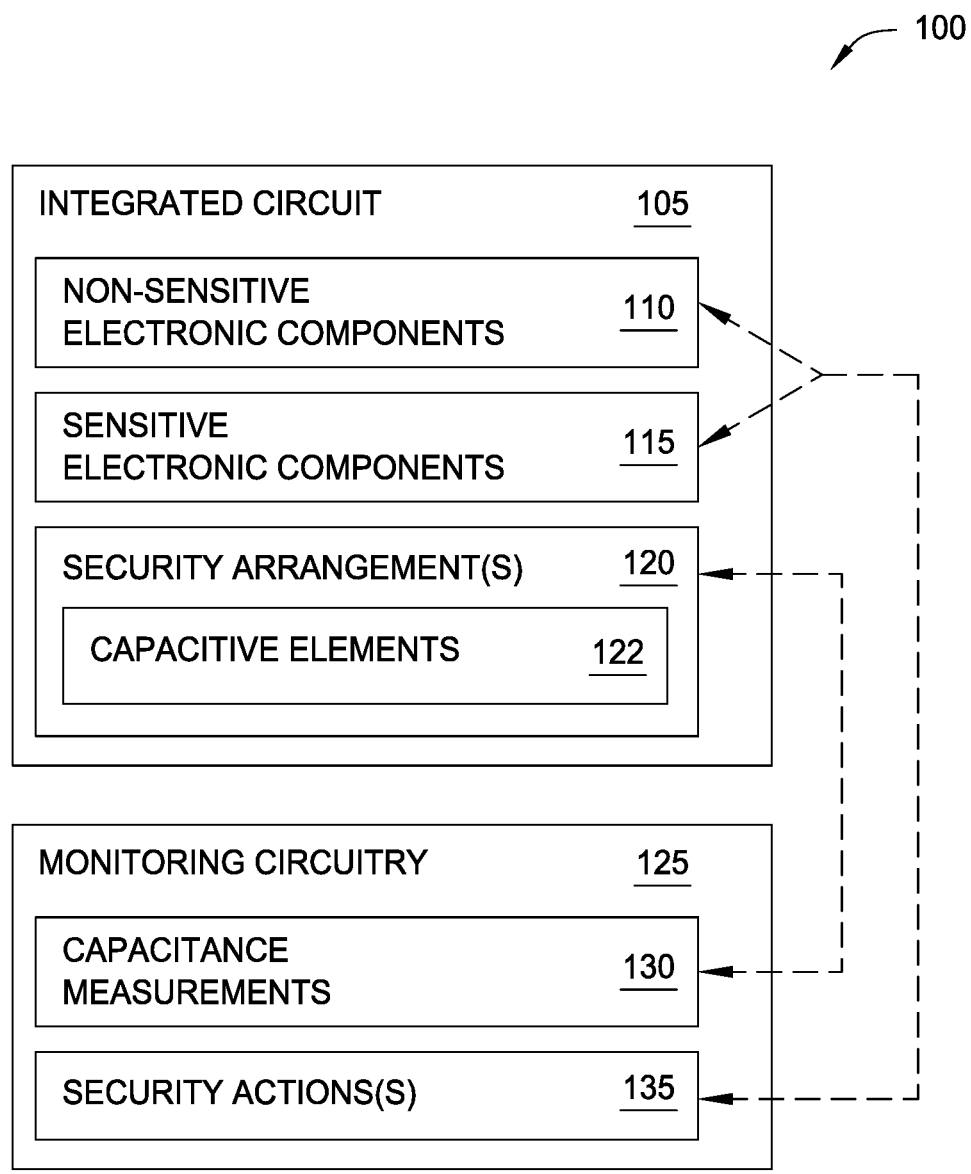
FIG. 1 is a block diagram illustrating an apparatus comprising an exemplary security arrangement, according to embodiments described herein.

FIG. 1 is a block diagram illustrating an apparatus 100 comprising an exemplary security arrangement, according to embodiments described herein. The apparatus 100 comprises an integrated circuit (IC) 105 having any suitable functionality. Some non-limiting examples of the IC 105 include logic ICs such as microprocessors, microcontrollers, and field-programmable gate arrays (FPGAs). Other non-limiting examples of the IC 105 include memory ICs such as random access memory (RAM), read-only memory (ROM), and non-volatile RAM (or Flash memory). In some cases, a memory IC may be integrated in a storage device such as a solid-state drive (SSD).

The IC 105 comprises a plurality of electronic components, which may include one or more non-sensitive electronic components 110 and one or more sensitive electronic components 115. The sensitive electronic components 115 may generally include proprietary or otherwise sensitive functionality and/or may store sensitive data. For example, the sensitive electronic components 115 may be used to perform cryptographic operations and may store one or more keys for cryptographic algorithms.

The IC 105 further comprises one or more security arrangement(s) 120 configured to protect some or all of the electronic components from being observed via physical intrusions to the IC 105. One example of a physical intrusion is drilling a small hole in the IC 105 to provide access for a probe to couple with electronic components of the IC 105. The security arrangement(s) 120 generally comprise multiple conductive layers that each defines an array of conductive elements, where combinations of overlapping conductive elements form a plurality of capacitive elements 122. In some embodiments, the capacitive elements 122 comprise capacitive plate elements that overlap different electronic components of the IC 105. Generally the conductive elements 122 are dimensioned and arranged such that physical intrusions of the IC 105 will intrude at least one conductive element of a capacitive element 122. The intrusion of a conductive element causes changes to a capacitance of the associated capacitive element 122.

The apparatus further comprises monitoring circuitry 125 that is generally configured to acquire capacitive measurements 130 corresponding to the plurality of capacitive elements 122. Monitoring circuitry 125 may acquire the capacitive measurements 130 according to any suitable techniques, such as using a timer circuit and calculating a frequency inversely proportional to capacitance, using a reference capacitor in a charge balancing scheme, using a capacitance bridge, using an op-amp integrator, and so forth. The monitoring circuitry 125 may include a memory to store the capacitive measurements 130 for the various capacitive elements 122. In some embodiments, the memory stores a plurality of capacitive measurements 130 for each of the capacitive elements 122.

While depicted separately from the IC 105, in alternate embodiments the monitoring circuitry 125 is at least partly included in the IC 105. In one embodiment, the monitoring circuitry 125 is entirely included in the IC 105 and may also be protected by the security arrangement(s) 120.

Using the capacitive measurements 130, the monitoring circuitry 125 is configured to detect a change in a capacitance of a first capacitive element 122 of the plurality of capacitive elements 122 that is responsive to a physical intrusion of the security arrangement 120. In some embodiments, upon detecting a change in capacitance of one or more capacitive elements 122, the monitoring circuitry 125 determines a location of the one or more capacitive elements 122 within the security arrangement 120. In some embodiments, the monitoring circuitry 125 determines a location when the change in capacitance is greater than a non-zero threshold value.

Based on the determined location of the one or more capacitive elements 122, the monitoring circuitry 125 determines whether to perform a predefined security action 135. Stated another way, based on which electronic components of the IC 105 are overlapped by the one or more capacitive elements 122, the monitoring circuitry 125 determines whether to perform the predefined security action 135. As used herein, a predefined security action 135 is generally performed by the IC 105 to obscure or thwart attempts to acquire information regarding electronic components of the IC 105. As used herein, a capacitive element 122 "overlapping" a first electronic component is intended to include overlapping any conductive connections with the first electronic component (e.g., conductive traces connecting the first electronic component with at least a second electronic component). In this way, the security arrangement 120 can detect whether physical intrusions of the IC 105 are intended to target sensitive electronic components 115.

In some embodiments, the predefined security action 135 is selected from a group consisting of at least one of: a shutdown operation, a spoofing operation, and a self-destruct operation. Other suitable security actions 135 are also possible. The predefined security action 135 is applied to at least some of the electronic components that are overlapped by the capacitive element 122. In some cases, the predefined security action 135 is applied to all of the overlapped electronic components. In other cases, the predefined security 135 is applied to only the sensitive electronic components 115 that are overlapped by the capacitive element 122. In this way, the predefined security action 135 can obscure or thwart attempts to acquire, via physical intrusions to the IC 105, information regarding the sensitive electronic components 115.

In some cases, the monitoring circuitry 125 determines that the one or more capacitive elements 122 (i.e., having a changed capacitance) overlap only non-sensitive electronic components 110. In other words, the one or more capacitive elements 122 do not overlap any sensitive electronic components 115. In one embodiment, the monitoring circuit 125 determines to not perform a predefined security action 135 when the one or more capacitive elements 122 do not overlap any sensitive electronic components 115. In another embodiment, the monitoring circuit 125 performs a first security action 135 when the one or more capacitive elements 122 overlap any sensitive electronic components 115, and performs second, different security action 135 when the one or more capacitive elements 122 do not overlap any sensitive electronic components 115.

In some embodiments, a memory of the monitoring circuit 125 may record or log detected changes in capacitance of the one or more capacitive elements 122. In some cases, the monitoring circuit 125 is further configured to perform a predefined security action 135 when a number of detected changes in capacitance or when a number of capacitive elements 122 exceeds a predefined threshold value. This may be done independent of whether the one or more capacitive elements 122 overlap any sensitive electronic components 115. In one example, the monitoring circuit 125 causes the IC 105 to perform a self-destruct operation responsive to a physical intrusion of several capacitive elements 122, which more strongly suggests a deliberate attempt to acquire information regarding different electronic components of the IC 105.

Figure 2:
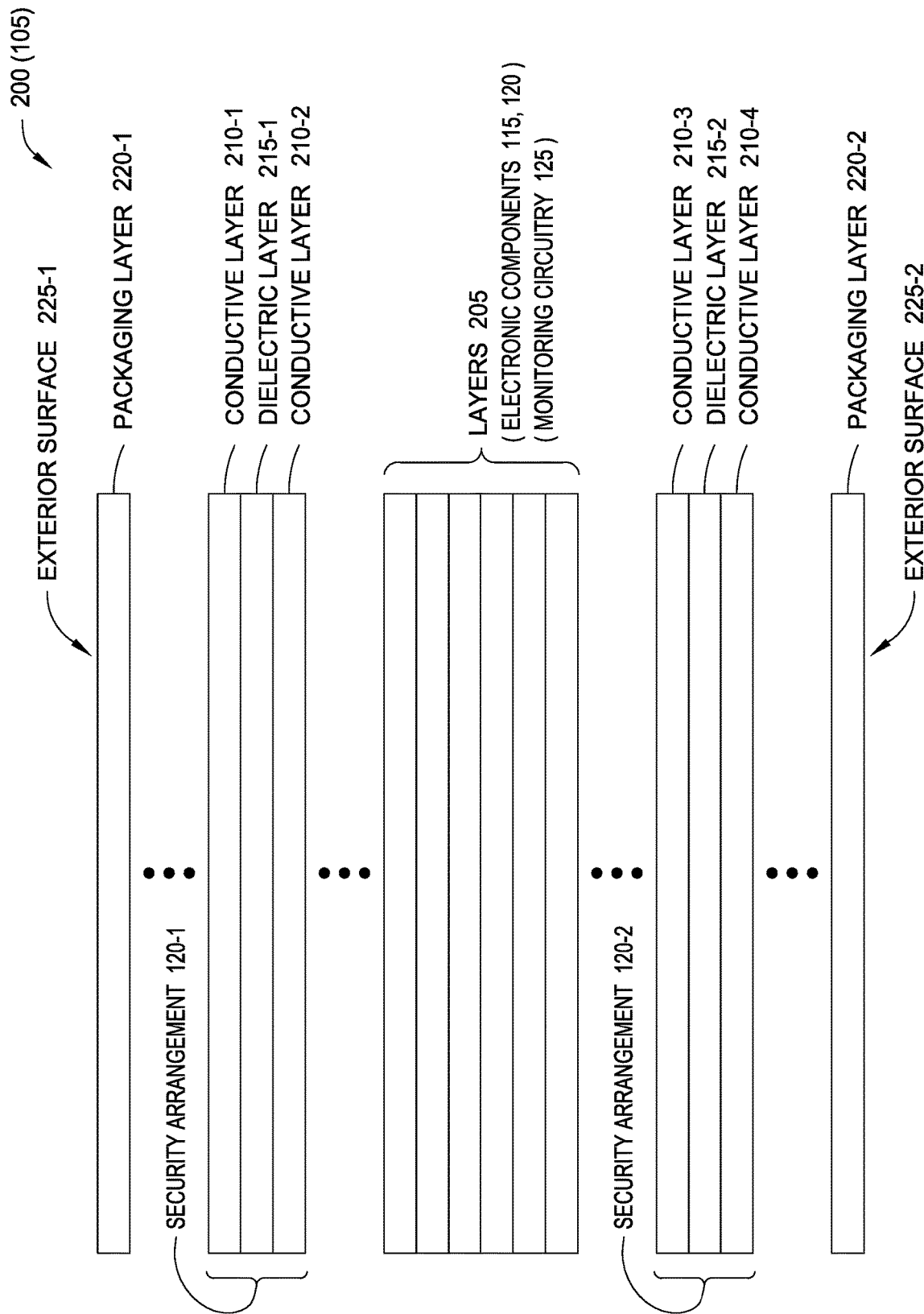
FIG. 2 is a schematic diagram illustrating an exploded cross section of an integrated circuit comprising an exemplary security arrangement, according to embodiments described herein.

FIG. 2 is a schematic diagram illustrating an exploded cross-section view of an IC 200 comprising an exemplary security arrangement, according to embodiments described herein. The IC 200 defines a plurality of exterior surfaces 225-1, 225-2. As shown, the exterior surfaces 225-1, 225-2 are defined by packaging layers 220-1, 220-2 that generally encapsulate the electronic components defined within the IC 200, but this is not a hard fast requirement.

The IC 200 comprises a plurality of layers 205 forming a plurality of electronic components, such as one or more sensitive electronic components 115 and/or one or more non-sensitive electronic components 110. While the individual layers of the plurality of layers 205 are not specifically labeled, the particular arrangements of layers for forming the plurality of electronic components will be understood by persons of ordinary skill in the art. Generally, the plurality of layers 205 can include one or more semiconductor layers, one or more dielectric layers, and/or one or more metal layers. As discussed above, the plurality of electronic components formed in the plurality of layers 205 may include some or all of the monitoring circuitry 125.

A first security arrangement 120-1 is disposed between the plurality of layers 205 and the exterior surface 225-1, and a second security arrangement 120-2 is disposed between the plurality of layers 205 and the exterior surface 225-2. The first security arrangement 120-1 comprises a first conductive layer 210-1 patterned as a first array of a plurality of first conductive elements. The first security arrangement 120-1 further comprises a second conductive layer 201-2 separated from the first conductive layer 210-1 by a dielectric layer 215-1 and patterned as a second array of a plurality of second conductive elements. The first array and the second array collectively form a plurality of capacitive elements of the first security arrangement 120-1.

The second security arrangement 120-2 comprises a third conductive layer 210-3 patterned as a third array of a plurality of third conductive elements. The second security arrangement 120-2 further comprises a fourth conductive layer 201-4 separated from the third conductive layer 210-3 by a dielectric layer 215-2 and patterned as a fourth array of a plurality of fourth conductive elements. The third array and the fourth array collectively form a plurality of capacitive elements of the second security arrangement 120-2.

Other layers and/or other arrangements of the layers of the first security arrangement 120-1 and the second security arrangement 120-2 are possible. Additionally, while two security arrangements 120-1, 120-2 are depicted within IC 105, alternative implementations may include different numbers of security arrangements, such as a single security arrangement or three or more security arrangements.

Figure 3:
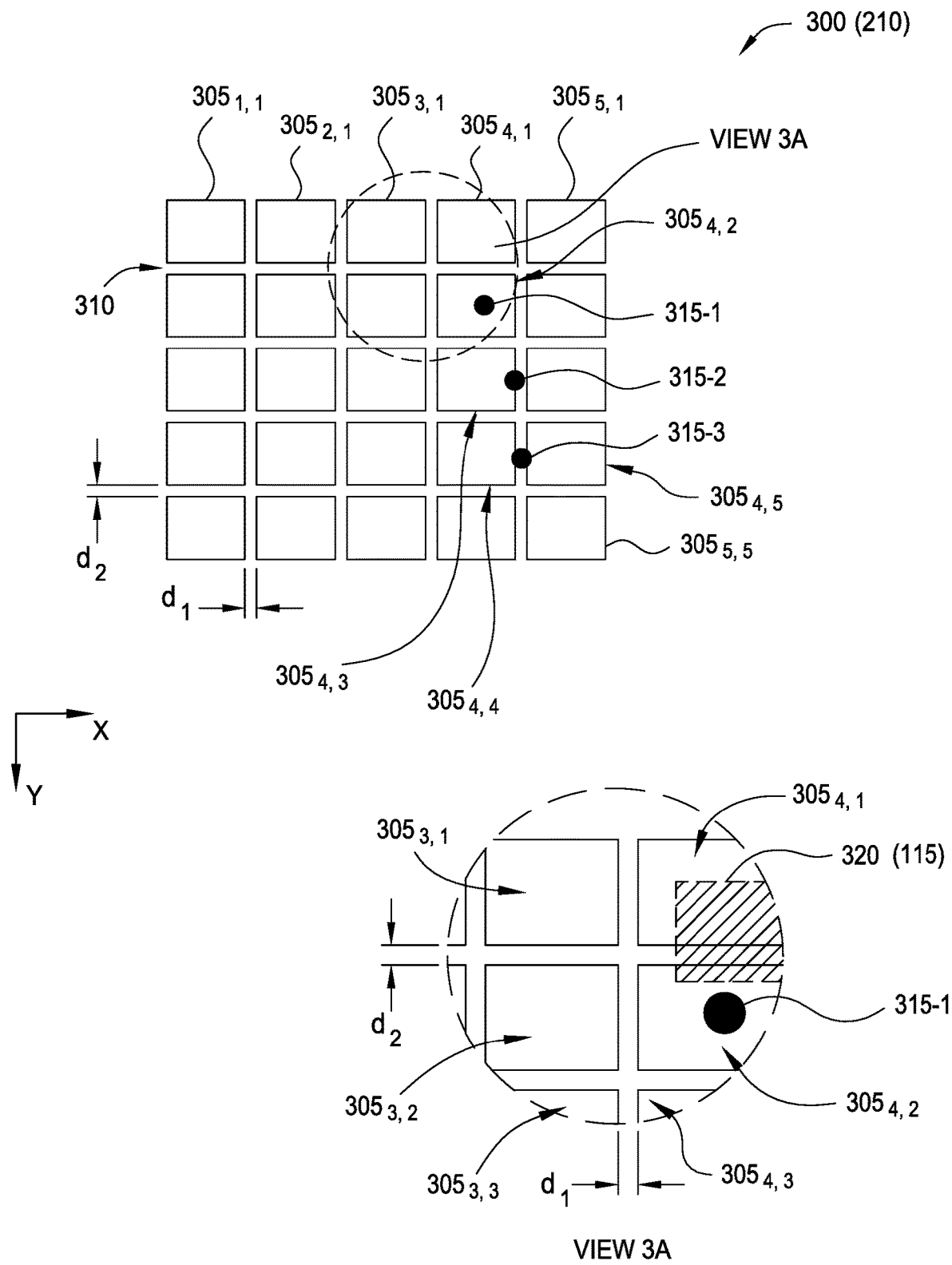
FIG. 3 is a schematic diagram of an exemplary array of a plurality of conductive elements, according to embodiments described herein.

FIG. 3 is a schematic diagram of an exemplary array 300 of a plurality of conductive elements, according to embodiments described herein. The array 300 generally may be used within a conductive layer 210 of a security arrangement. As shown, the array 300 comprises a 5×5 array of conductive elements $305_{1,1}$ to $305_{5,5}$ (generically, conductive elements 305) although other sizes are also possible. The array 300 comprises a repeating array, although this is not a hard fast requirement. Additionally, the array 300 comprises a rectangular array in which the conductive elements 305 are formed as rectangular shapes, although other shapes and arrangements are also possible. Some non-limiting examples of shapes and arrangements are discussed below with respect to FIG. 4.

The conductive elements 305 of the array 300 are spaced apart by separation regions 310. As shown, the separation regions 310 comprise a first distance $d_1$ between adjacent columns of conductive elements 305, and a second distance $d_2$ between adjacent rows of conductive elements 305. In other implementation, the distances between adjacent conductive elements 305 may be different. In some embodiments, the separation regions 310 are sized to be compliant with a predetermined security standard, such as Federal Information Processing Standard (FIPS) Publication 140-2 or 140-3. For example, each of the first distance $d_1$ and the second distance $d_2$ may be less than a predefined spacing distance. Thus, for a predefined spacing distance such as four (4) microns, drilled holes or other physical intrusions that have at least one dimension larger than four microns are guaranteed to intrude at least one conductive element 305, which may be detected by monitoring circuitry due to changes in capacitance.

In some embodiments, conductive elements 305 of each conductive layer 210 of a security arrangement are aligned (substantially completely overlapping). In other embodiments, the conductive elements 305 of a first conductive layer 210 are staggered relative to conductive elements 305 of a second conductive layer 210, such that the conductive elements 305 of the first conductive layer 210 at least partly overlap the separation regions 310 of the second conductive layer.

A plurality of different intrusion locations 315-1, 315-2, 315-3 (such as drilled holes) are illustrated in array 300. The intrusion location 315-1 is defined entirely within a conductive element $305_{4,2}$, the intrusion location 315-2 is defined partly within a conductive element $305_{4,3}$ and partly within a separation region 310, and the intrusion location 315-3 is defined partly within conductive elements $305_{4,4}$ and $305_{4,5}$ and partly within a separation region 310. Based on the physical intrusions, the monitoring circuitry is configured to identify which conductive element(s) 305 (and associated capacitive element(s)) have been physically intruded. For example, for intrusion location 315-1 the monitoring circuitry identifies conductive element $305_{4,2}$, for intrusion location 315-2 the monitoring circuitry identifies conductive element $305_{4,3}$, and for intrusion location 315-3 the monitoring circuitry identifies conductive elements $305_{4,4}$ and $305_{4,5}$.

As shown in the inset, one or more sensitive electronic components 115 are arranged within a region 320 that is overlapped by conductive elements $305_{4,1}$ and $305_{4,2}$. Thus, upon identifying a change of capacitance of conductive element $305_{4,2}$ caused by the physical intrusion at intrusion location 315-1, the monitoring circuitry determines to perform a predefined security action 135 using at least the sensitive electronic components 115. This may be the case even where the intrusion location 315-1 does not overlap the region 320.

FIG. 4 includes schematic diagrams of alternative patterns for an array of conductive elements, according to embodiments described herein. Generally, the schematic diagrams provide non-limiting examples of repeating arrays of conductive elements. The person of ordinary skill in the art will understand, however, that the techniques discussed herein may be extended to other types of arrays of conductive elements, such as non-repeating arrays. Within diagram 405, the plurality of conductive elements 305 are hexagonal-shaped. Within diagram 410, the plurality of conductive elements 305 are triangular-shaped.

The conductive elements 305 depicted in array 300 (FIG. 3) and diagrams 405, 410 are each formed as same-sized solid shapes. However, other implementations may include different shapes and/or different sizes of the conductive elements 305. In other embodiments, the conductive elements 305 may be formed as elongated shapes, such as serpentine shapes. Diagram 415 illustrates a rectangular grid having a plurality of grid locations 420, where each grid location 420 includes a respective conductive element 305 formed in a serpentine shape that defines one or more separation regions. In some embodiments, the conductive element 305 is formed such that distances $d_3$, $d_4$, $d_5$ of the separation regions are less than a predefined spacing distance. Thus, drilled holes or other physical intrusions that have at least one dimension larger than the predefined spacing distance are guaranteed to intrude at least one conductive element 305, which may be detected by monitoring circuitry due to changes in capacitance.

FIG. 5 is a schematic diagram 500 illustrating staggered arrays of conductive elements, according to embodiments described herein. The staggered arrays are generally included within a security arrangement.

Diagram 500 illustrates a first conductive layer 210-1 arranged as a first array of conductive elements 305 and a separation region 310-1, and a second conductive layer 210-2 arranged as a second array of conductive elements 305 and a separation region 310-2. As shown, the conductive elements 305 are generally same-sized and the separation regions 310-1, 310-2 are generally same-sized, but this is not a hard fast requirement.

Due to the staggering of the first array and the second array, conductive elements 305 of the first conductive layer 210-1 at least partially overlap the separation region 310-2 of the second conductive layer, and vice versa. The partial overlapping generally increases the likelihood of a physical intrusion to intrude a conductive element 305, which increases the likelihood of detecting the physical intrusion through capacitance measurements. In alternate embodiments, the sizes, shapes, and/or arrangements of conductive elements 305 within first conductive layer 210-1 differ from those included in second conductive layer 210-2, such that the separation regions 310-1, 310-2 defined within one conductive layer are partially overlapped by conductive elements 305 of the other conductive layer.

Figure 6:
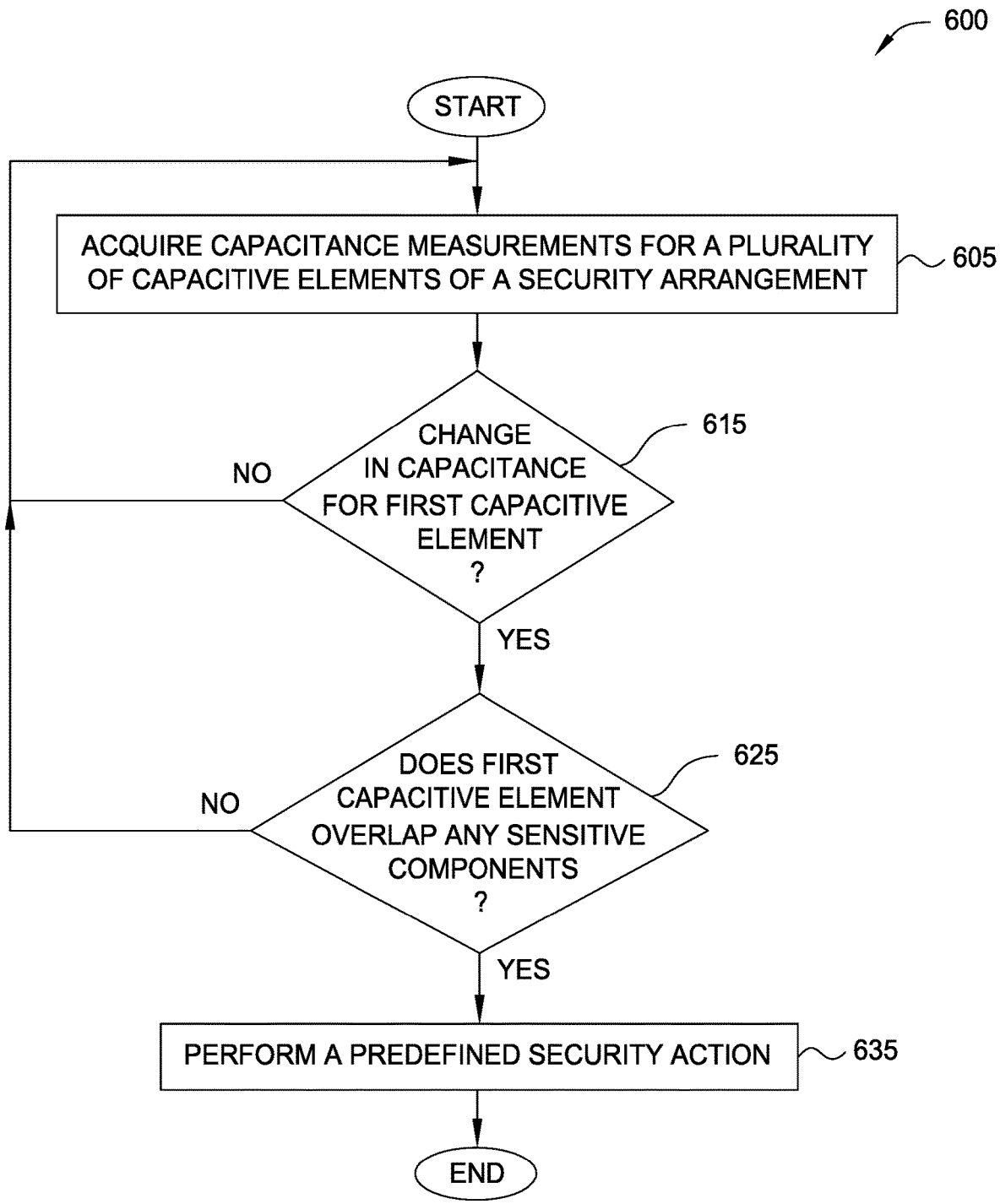
FIG. 6 illustrates a method for use with a security arrangement that overlaps a plurality of electronic components, according to embodiments described herein.

FIG. 6 illustrates a method 600 for use with a security arrangement that overlaps a plurality of electronic components of an IC, according to embodiments described herein. The method 600 may generally be performed by monitoring circuitry that is coupled with the security arrangement. The monitoring circuitry may be included in the IC or external to the IC.

Method 600 begins at block 605, where the monitoring circuitry acquires capacitance measurements for a plurality of capacitive elements of a security arrangement. At block 615, the monitoring circuitry determines whether there is a change in capacitance for a first capacitive element of the plurality of capacitive elements. If the monitoring circuitry determined that there is substantially no change in capacitance ("NO"), the method 600 returns to block 605 for acquiring additional capacitance measurements. If the monitoring circuitry determines a change of capacitance ("YES"), the method 600 proceeds to block 625 and the monitoring circuitry determines whether the first capacitive element overlaps any sensitive electronic components.

If the monitoring circuitry determines that the first capacitive element does not overlap any sensitive electronic components ("NO"), the method 600 returns to block 605. If the monitoring circuitry determines that at least one sensitive electronic component is overlapped ("YES"), the method 600 proceeds to block 635 and the monitoring circuitry performs a predefined security action. In some embodiments, the predefined security action is selected from a group consisting of at least one of: a shutdown operation, a spoofing operation, and a self-destruct operation. In alternate embodiments, if the monitoring circuitry determines that the first capacitive element does not overlap any sensitive electronic components at block 625, the monitoring circuitry performs a different predefined security action. Method 600 ends following completion of block 635.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An apparatus comprising:
    a first capacitive security arrangement comprising:
        a first conductive layer patterned as a first array of a plurality of first conductive elements, and
        a second conductive layer separated from the first conductive layer by a dielectric layer, the second conductive layer patterned as a second array of a plurality of second conductive elements, wherein the first array and the second array collectively form a plurality of capacitors, wherein the plurality of capacitors overlap a plurality of electronic components arranged within one or more layers; and
    monitoring circuitry coupled with the first capacitive security arrangement and configured to:
        identify a first capacitor of the plurality of capacitors based on a detected change in a capacitance of the first capacitor of the plurality of capacitors, wherein the change in the capacitance indicates a physical intrusion of one or both of the first conductive layer and the second conductive layer at the first capacitor, and
        in response to identifying the first capacitor, perform, based on a location of the first capacitor within the plurality of capacitors, a first predefined security action;
        identify a second capacitor of the plurality of capacitors based on a detected change in a capacitance of the second capacitor of the plurality of capacitors, wherein the change in the capacitance indicates a second physical intrusion of one or both of the first conductive layer and the second conductive layer at the second capacitor, and
        in response to identifying the second capacitor, perform, based on a location of the second capacitor within the plurality of capacitors, a second predefined security action that is different than the first predefined security action.

2. The apparatus of claim 1, wherein the first capacitive security arrangement is arranged on a first side of the one or more layers, the apparatus further comprising:
a second capacitive security arrangement arranged on a second, opposing side of the one or more layers and that overlaps the plurality of electronic components.

3. The apparatus of claim 1, wherein the first array and the second array are each formed as repeating arrays.

4. The apparatus of claim 3, wherein the repeating arrays comprise rectangular arrays, and
wherein the first conductive elements and the second conductive elements are formed as rectangular shapes.

5. The apparatus of claim 1, wherein each capacitor of the plurality of capacitors is formed of a respective first conductive element and a respective second conductive element.

6. The apparatus of claim 1, wherein individual first conductive elements of the plurality of first conductive elements are separated by first separation regions that do not exceed a predefined spacing distance, and
wherein individual second conductive elements of the plurality of second conductive elements are separated by second separation regions that do not exceed the predefined spacing distance.

7. The apparatus of claim 6, wherein the first array and the second array are staggered such that the second separation regions are overlapped by the first conductive elements.

8. The apparatus of claim 1, wherein the first conductive elements are formed as solid hexagonal shapes in a plane of the first conductive layer.

9. The apparatus of claim 1, wherein the first conductive elements and the second conductive elements are formed as serpentine shapes, and
wherein each serpentine shape defines one or more separation regions that do not exceed a predefined spacing distance.

10. An integrated circuit defining one or more exterior surfaces, the integrated circuit comprising:
one or more layers having a plurality of electronic components defined therein;
a first security capacitive arrangement disposed between the one or more layers and a first exterior surface of the integrated circuit, wherein the first capacitive security arrangement comprises a plurality of capacitors that spatially overlap the plurality of electronic components; and
monitoring circuitry configured to:
identify in response to a first physical intrusion of the first capacitive security arrangement, a first capacitor of the plurality of capacitors based on a change in a capacitance of the first capacitor of the plurality of capacitors,
in response to identifying the first capacitor, determine, based on which of the plurality of electronic components are overlapped by the first capacitor, whether to perform a first predefined security action,
identify in response to a second physical intrusion of the first capacitive security arrangement, a second capacitor of the plurality of capacitors based on a change in a capacitance of the second capacitor of the plurality of capacitors, and
in response to identifying the second capacitor, determine, based on which of the plurality of electronic components are overlapped by the second capacitor, whether to perform a second predefined security action that is different than the first predefined security action.

11. The integrated circuit of claim 10, further comprising:
a second capacitive security arrangement disposed between the one or more layers and a second, opposing exterior surface of the integrated circuit, wherein the second capacitive security arrangement spatially overlaps the plurality of electronic components.

12. The integrated circuit of claim 10, wherein the first capacitive security arrangement comprises:
a first conductive layer patterned as a first array of a plurality of first conductive elements, and
a second conductive layer separated from the first conductive layer by a dielectric layer, the second conductive layer patterned as a second array of a plurality of second conductive elements, wherein the first array and the second array collectively form the plurality of capacitors.

13. The integrated circuit of claim 12, wherein the first array and the second array are each formed as repeating arrays.

14. The integrated circuit of claim 13, wherein the repeating arrays comprise rectangular arrays, and
wherein the first conductive elements and the second conductive elements are formed as rectangular shapes.

15. The integrated circuit of claim 12, wherein each capacitor of the plurality of capacitors is formed of a respective first conductive element and a respective second conductive element.

16. The integrated circuit of claim 12, wherein individual first conductive elements of the plurality of first conductive elements are separated by first separation regions that do not exceed a predefined spacing distance, and
wherein individual second conductive elements of the plurality of second conductive elements are separated by second separation regions that do not exceed the predefined spacing distance.

17. The integrated circuit of claim 16, wherein the first array and the second array are staggered such that the second separation regions are overlapped by the first conductive elements.

18. A method for use with a security arrangement that overlaps a plurality of electronic components, the plurality of electronic components arranged within one or more layers of an integrated circuit, the security arrangement comprising a first conductive layer electrically insulated from a second conductive layer, the method comprising:
identifying a first capacitor of a plurality of capacitors based on detecting a first change in a first capacitance of the first capacitor, wherein the plurality of capacitors are formed of a plurality of first conductive elements of the first conductive layer and a plurality of second conductive elements of the second conductive layer, wherein the first change in the first capacitance indicates a first physical intrusion of one or both of the first conductive layer and the second conductive layer at the first capacitor;
in response to identifying the first capacitor, performing, based on which of the plurality of electronic components are overlapped by the first capacitor, a first predefined security action; and
identifying a second capacitor of the plurality of capacitors based on detecting a second change in a second capacitance of the second capacitor, wherein the second change in the second capacitance indicates a second physical intrusion of one or both of the first conductive layer and the second conductive layer at the second capacitor; and in response to identifying the second capacitor, performing, based on which of the plurality of electronic components are overlapped by the second capacitor, a second predefined security action that is different than the first predefined security action.

19. The method of claim 18, wherein when the first capacitor overlaps a non-sensitive electronic component of the plurality of components, the first predefined security action is a null action; and wherein when the second capacitor overlaps a sensitive electronic component of the plurality of component, the second predefined security action is selected from a group consisting of:

a spoofing operation;

a shutdown operation; and a self-destruct operation.

\* \* \* \* \*